(12) United States Patent
Pearl, Jr. et al.

(10) Patent No.: US 11,613,690 B2
(45) Date of Patent: Mar. 28, 2023

(54) POLYMER NETWORKS AS LOST-CIRCULATION MATERIAL

(71) Applicant: Halliburton Energy Services, Inc., Houston, TX (US)

(72) Inventors: William Cecil Pearl, Jr., Houston, TX (US); Samuel J Lewis, Houston, TX (US); Aleksey V Kolasnikov, Houston, TX (US); Claudia Carmen Pineda, Houston, TX (US); Stephanie Ruiz, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/662,681

(22) Filed: May 10, 2022

(65) Prior Publication Data

US 2022/0259483 A1 Aug. 18, 2022

Related U.S. Application Data

(62) Division of application No. 17/026,241, filed on Sep. 20, 2020, now Pat. No. 11,377,582.

(51) Int. Cl.
*C09K 8/512* (2006.01)
*C09K 8/508* (2006.01)
*E21B 21/00* (2006.01)

(52) U.S. Cl.
CPC ............ *C09K 8/512* (2013.01); *C09K 8/5083* (2013.01); *E21B 21/003* (2013.01)

(58) Field of Classification Search
None
See application file for complete search history.

(56) References Cited

U.S. PATENT DOCUMENTS 3,883,489 A * 5/1975 Matschke ............. C08F 261/04
524/427
4,643,255 A 2/1987 Sandiford et al.
(Continued)

FOREIGN PATENT DOCUMENTS

EP 0705850 A1 10/1996
WO 2019163490 A1 8/2019

OTHER PUBLICATIONS

R. Baudry and D.C. Sherrington, Facile Synthesis of Branched Poly(vinyl alcohol)s, Macromolecules, Department of Pure and Applied Chemistry, Westchem Graduate School of Chemistry, University of Strathclyde, Jun. 2006, pp. 5230-5237, vol. 39, No. 16, Scotland, U.K.
(Continued)

*Primary Examiner* — Andrew Sue-Ako
(74) *Attorney, Agent, or Firm* — Sheri Higgins Law PLLC; Sheri Higgins

(57) ABSTRACT

A treatment fluid can include: a base fluid, wherein the base fluid comprises water; and a lost-circulation material, wherein the lost-circulation material comprises a polymer network having at least one branching point formed with a monomer and a cross-linking agent that comprises at least three active functional groups. The treatment fluid can maintain a pressure differential of at least 1 psi when tested with a cylindrical void that has a diameter of 0.02 inches. The monomer can be a vinyl ester-based monomer that is polymerized with the cross-linking agent to form the polymer network. The treatment fluid can be used in an oil and gas operation.

18 Claims, 1 Drawing Sheet

(56) References Cited

U.S. PATENT DOCUMENTS

| | | | |
|---|---|---|---|
| 5,061,387 A | 10/1991 | Victorius | |
| 11,377,582 B2 * | 7/2022 | Pearl, Jr. | ................ C09K 8/512 |
| 2004/0244978 A1 | 12/2004 | Shaarpour | |
| 2005/0080182 A1 | 4/2005 | Ahmed et al. | |
| 2011/0114318 A1 | 5/2011 | Ezell et al. | |
| 2013/0310283 A1 | 11/2013 | Athey et al. | |
| 2016/0355722 A1 | 12/2016 | Galindo et al. | |
| 2019/0153290 A1 | 5/2019 | Katou et al. | |
| 2020/0071597 A1 | 3/2020 | Ghebremeskel et al. | |
| 2020/0071599 A1 | 3/2020 | Ghebremeskel et al. | |
| 2020/0224076 A1 | 7/2020 | Yamashita et al. | |

OTHER PUBLICATIONS

English Translation of WO 2019163490 A1.

\* cited by examiner

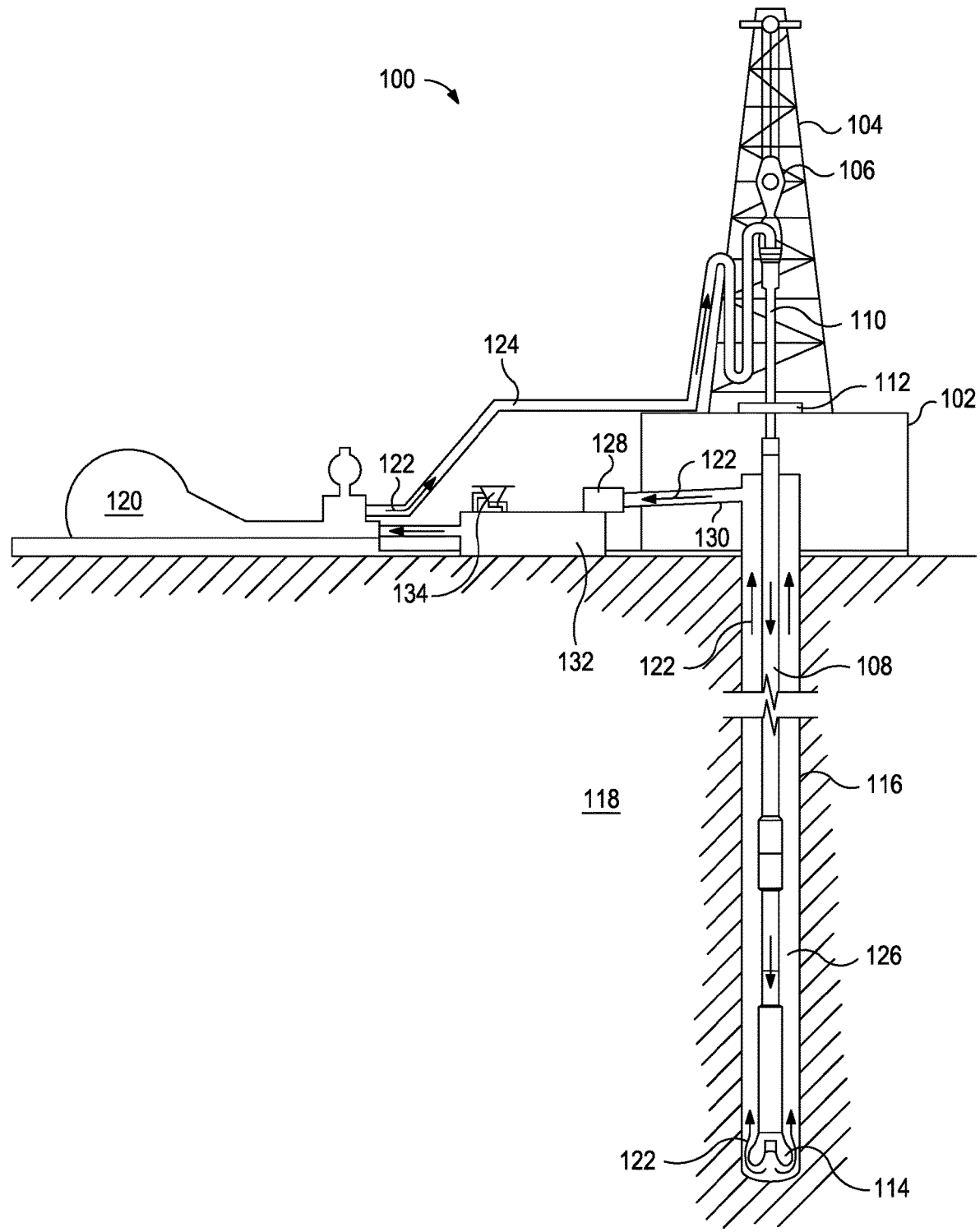

POLYMER NETWORKS AS LOST-CIRCULATION MATERIAL

TECHNICAL FIELD

Wellbore treatment operations can involve pumping a treatment fluid into a wellbore. The treatment fluid generally includes a liquid as the base fluid. During introduction into the wellbore, some of the base fluid can be lost into a subterranean formation that is penetrated by the wellbore. Improved lost-circulation materials can be used to reduce the amount of base fluid that is lost.

BRIEF DESCRIPTION OF THE FIGURES

The features and advantages of certain embodiments will be more readily appreciated when considered in conjunction with the accompanying figures. The figures are not to be construed as limiting any of the preferred embodiments.

FIG. 1 illustrates a system for introducing a treatment fluid into a wellbore.

DETAILED DESCRIPTION

Oil and gas hydrocarbons are naturally occurring in some subterranean formations. In the oil and gas industry, a subterranean formation containing oil and/or gas is referred to as a reservoir. A reservoir can be located under land or offshore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from a reservoir is called a reservoir fluid.

As used herein, a "fluid" is a substance having a continuous phase that can flow and conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase; whereas a heterogeneous fluid has more than one distinct phase. A colloid is an example of a heterogeneous fluid. A heterogeneous fluid can be: a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and liquid droplets as the dispersed phase. As used herein, the term "base fluid" means the solvent of a solution or the continuous phase of a heterogeneous fluid and is the liquid that is in the greatest percentage by volume of a treatment fluid.

A well can include, without limitation, an oil, gas, or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet radially of the wellbore. As used herein, "into a subterranean formation" means and includes into any portion of the well, including into the wellbore, into the near-wellbore region via the wellbore, or into the subterranean formation via the wellbore.

A portion of a wellbore can be an open hole or cased hole. In an open-hole wellbore portion, a tubing string can be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

Oil or gas operations can be performed using a treatment fluid. The term "treatment fluid" refers to the specific composition of the fluid as it is being introduced into a well. The word "treatment" in the term "treatment fluid" does not necessarily imply any particular action by the fluid. Examples of treatment fluids include, but are not limited to, drilling fluids, spacer fluids, workover fluids, cement compositions, and stimulation fluids.

During drilling operations, a wellbore is formed using a drill bit. A drill string can be used to aid the drill bit in drilling through a subterranean formation to form the wellbore. The drill string can include a drilling pipe. A treatment fluid adapted for this purpose is referred to as a drilling fluid or drilling mud. The wellbore defines a wellbore wall that is the exposed portion of the subterranean formation where the wellbore was formed. The drilling fluid may be circulated downwardly through the drilling pipe and back up the annulus between the wellbore wall and the outside of the drilling pipe.

After a wellbore is formed, it may be desirable to perform a cementing operation. A treatment fluid called a spacer fluid can be introduced into the wellbore after the drilling fluid and before the cement composition. The spacer fluid can flush residual drilling fluid that may remain in parts of the wellbore or face of the subterranean formation to help ensure better bonding of the cement composition to the interface. Other types of oil or gas operations, for example, completion or workover operations can also be performed with a treatment fluid.

The wellbore wall and near-wellbore region of the subterranean formation can include permeable areas. Examples of permeable areas include cracks, natural fissures, fractures, vugs, interconnected pores, or induced fractures. Cracks, fissures, and fractures can generally be characterized as having a length greater than its diameter. Vugs and holes can be characterized as being any cavity having a variety of shapes and sizes. Porosity refers to the number of individual pores within an area of the subterranean formation. Permeability, in this context, refers to the amount of interconnectivity between the individual pores that allows fluid to migrate or move between the interconnected pores. Permeable areas in the wall of the wellbore and near-wellbore region can vary and have dimensions ranging from 0.1 micrometers and as large as 50 micrometers or larger. As used herein, a "permeable area" means any area where fluid can flow into the subterranean formation via a wellbore and can be caused by—without limitation—cracks, fissures, fractures, cavities, and interconnected pores.

Some of the base fluid of a treatment fluid can undesirably flow into the subterranean formation via the permeable areas instead of remaining in the wellbore and being circulated back up to the wellhead. This is known as lost circulation.

In order to overcome the problems associated with lost circulation, a lost-circulation material ("LCM") can be used. LCMs can be swellable or non-swellable. As the treatment fluid is placed into the well, the LCM can eliminate or lessen the amount of liquid base fluid entering the subterranean formation.

Common LCM can include insoluble particulates, such as walnut shells. The insoluble particulates of the LCM can build upon each other and form a bridge over or within the permeable areas of the subterranean formation. The bridge can eliminate or reduce the amount of liquid base fluid entering the subterranean formation via the wellbore.

Other types of common LCM can include swellable polymers. A polymer is a molecule composed of repeating units, typically connected by covalent chemical bonds. A polymer is formed from monomers. During the formation of the polymer, some chemical groups can be lost from each monomer. The piece of the monomer that is incorporated into the polymer is known as the repeating unit or monomer residue. The backbone of the polymer is the continuous link between the monomer residues. The polymer can also contain pendant functional groups connected to the backbone at various locations along the backbone. Polymer nomenclature is generally based upon the type of monomer residues comprising the polymer. A polymer formed from one type of monomer residue is called a homopolymer. A polymer formed from two or more different types of monomer residues is called a copolymer. The number of repeating units of a polymer is referred to as the chain length of the polymer. The number of repeating units of a polymer can range from approximately 11 to greater than 10,000. In a copolymer, the repeating units from each of the monomer residues can be arranged in various manners along the polymer chain. For example, the repeating units can be random, alternating, periodic, or block. The conditions of the polymerization reaction can be adjusted to help control the average number of repeating units (the average chain length) of the polymer. Polymer molecules can be cross-linked. As used herein, a "cross-link" and all grammatical variations thereof is a bond between two or more polymer molecules—typically between pendent functional groups of the polymer and reactive functional groups of a cross-linking agent. Cross-linked polymer molecules can form a polymer network.

Some examples of water-swellable polymers for use as a LCM include 2-acrylamido-2-methylpropane sulfonic acid (AMPS), polyacrylate (acrylic acid and acrylamide), poly (ethylene oxide), starch acrylate copolymer, and carboxymethyl cellulose.

There are several disadvantages to using insoluble particulates as a LCM. One significant disadvantage is that insoluble particulates can prematurely bridge upon each other in areas of tubing strings or downhole equipment having a tight clearance and/or sharp angles. This premature bridging can obstruct desired fluid flow through the tubing strings and into an annulus. Moreover, some traditional water-swellable polymers may not reduce fluid loss to acceptable levels. Thus, there is a need and on-going industry wide concern for new lost-circulation materials that provide improved lost circulation control, can be used with tight clearances, and are more economical.

It has unexpectedly been discovered that a water soluble, branched polymer network can be used as a lost-circulation material. Some of the advantages to the new solids-free LCM include no premature clogging within the flow path, lower cost, improved performance, and more environmentally friendly.

It is to be understood that if any test (e.g., fluid loss, rheology, or plastic viscosity) specifies the test be performed at a specified temperature and possibly a specified pressure, then the temperature and pressure of the test fluid is ramped up to the specified temperature and pressure after being mixed at ambient temperature and pressure. As used herein, the rate of ramping up the temperature is in the range of about 3° F./min to about 5° F./min (about 1.5° C./min to about 3° C./min). After the test fluid is ramped up to the specified temperature and possibly pressure, the test fluid is maintained at that temperature and pressure for the duration of the testing.

As used herein, the "fluid loss" of a test fluid is tested according to the API 10B-2 static fluid loss procedure at a specified temperature and pressure differential as follows. The test fluid is mixed. The test fluid is placed into an atmospheric consistometer, such as a FANN® Model 165 AT consistometer, heated to the specified temperature, and then maintained at the specified temperature for 20 minutes. A test cell of a fluid loss test assembly, such as a FANN® fluid loss test assembly, fitted with a 60 mesh screen is pre-heated to the specified temperature. The test fluid is then placed into the test cell of the fluid loss test assembly. The test fluid is then tested for fluid loss at the specified pressure differential. Fluid loss is measured in milliliters (mL) of fluid collected in 30 min. The total mL of fluid loss is then multiplied by 2 to obtain the API fluid loss for the test fluid in mL/30 min.

A treatment fluid should exhibit good rheology. Rheology is a measure of how a material deforms and flows. As used herein, the "rheology" of a treatment fluid is measured according to ANSI/API 13B-1 section 6.3, Recommended Practice for Field Testing of Water-based Drilling Fluids as follows. The treatment fluid is mixed. The treatment fluid is placed into the test cell of a rotational viscometer, such as a FANN® Model 35 viscometer, fitted with a Bob and Sleeve attachment and a F1 spring number. The treatment fluid is tested at the specified temperature and ambient pressure, about 1 atm (0.1 MPa). Rheology readings are taken at multiple revolutions per minute "rpm," for example, at 3, 6, 30, 60, 100, 200, and 300.

As used herein, the "plastic viscosity" of a treatment fluid is obtained from the Bingham-Plastic rheological model and calculated as the difference between the 600 rpm and 300 rpm dial readings from the rheology testing, expressed in units of cP.

The yield point ("YP") is defined as the value obtained from the Bingham-Plastic rheological model when extrapolated to a shear rate of zero. As used herein, the "yield point" of a treatment fluid is calculated as the difference between the plastic viscosity and the 300 rpm dial reading, expressed in units of 1 bf/100 ft$^2$. To convert the units to Pa, the difference is multiplied by 0.48.

A treatment fluid can include: a base fluid, wherein the base fluid comprises water; and a lost-circulation material, wherein the lost-circulation material comprises a polymer network having at least one branching point formed with a monomer and a cross-linking agent that comprises at least three active functional groups, wherein the treatment fluid maintains a pressure differential of at least 1 psi when tested with a cylindrical void that has a diameter of 0.02 inches.

Methods of treating a subterranean formation can include introducing the treatment fluid into the subterranean formation.

It is to be understood that the discussion of any of the embodiments regarding the treatment fluid or any ingredient in the treatment fluid is intended to apply to all of the method and composition embodiments without the need to repeat the various embodiments throughout. Any reference to the unit "gallons" means U.S. gallons.

The treatment fluid can be used in a variety of oil or gas operations. The treatment fluid according to certain embodiments is a non-settable fluid. As used herein, a "non-settable fluid" means any fluid that does not develop compressive strength or set. The term "set" means the process of becoming a solid via curing, for example. An example of a settable fluid is a cement composition. The treatment fluid can be, for example, a drilling fluid, a spacer fluid, a workover fluid, or a stimulation fluid.

The treatment fluid includes a base fluid. The base fluid comprises water. The water can be selected from the group consisting of freshwater, brackish water, and saltwater, in any combination thereof in any proportion. The base fluid can also include a water-soluble salt. The salt according to any of the embodiments can be selected from sodium chloride, calcium chloride, calcium bromide, potassium chloride, potassium bromide, magnesium chloride, and any combination thereof in any proportion. The salt can be in a concentration in the range of about 0.1% to about 40% by weight of the water.

The treatment fluid includes a lost-circulation material. The lost-circulation material comprises a polymer network having at least one branching point formed with a monomer and a cross-linking agent comprising at least three active functional groups. The cross-linking agent can be a poly-functional compound that is polymerized with the monomer to form the polymer network. The polymer network can include a water-soluble or water-swellable monomer. The monomer can be selected from vinyl ester-based monomers, for example, vinyl acetate, vinyl propionate, vinyl propionate, vinyl valerate, vinyl caprate, vinyl laurate, vinyl stearate, vinyl benzoate, vinyl pivalate, etc. and mixtures thereof.

Examples of other monomers that can be co-polymerized with the vinyl ester-based monomer include, for example, α-olefin monomers such as ethylene and propylene; methyl (meth)acrylate, (meth)acrylic acid alkyl ester monomers such as ethyl acidate, butyl (meth)acrylate, and 2-ethylhexyl (meth)acrylate; unsaturated amide monomers such as (meth) acrylamide and N-methylolacrylamide; unsaturated carboxylic acid monomers such as (meth)acrylic acid, crotonic acid, maleic acid, itaconic acid, fumaric acid; alkyl (methyl, ethyl, propyl, etc.) ester monomers of unsaturated carboxylic acids; unsaturated carboxylic acid anhydrides; salts of unsaturated carboxylic acids with sodium, potassium, ammonium, etc.; glycidyl group-containing monomers such as allyl glycidyl ether, glycidyl (meth)acrylate; 2-acrylamido-2-methylpropane sulfone including sulfonic acid group-containing monomers such as acids or salts thereof; phosphoric acid group-containing monomers such as acid phosphooxyethyl methacrylate and acid phosphooxypropyl methacrylate; and alkyl vinyl ether monomers.

The cross-linking agent has at least three active functional groups for polymerizing with the monomer and optionally other monomers. The cross-linking agent can also have four, five, etc. active functional groups. Below are sample illustrations of a single branching point with three, four, and five branches created from cross-linking of the polymer via the functional groups. Accordingly, each branching point can form a minimum of three bonds with pendant functional groups of the monomer to create a branched polymer network.

The cross-linking agent can be any compound having three or more active functional groups that bond with pendant functional groups of the monomer to form a polymer network. Examples of a cross-linking agent having three active functional groups can include, but are not limited to, propanediol divinyl ether, triallyl ethers, triallyl phosphate, triallyl isocyanurate (TTT), pentaerythritol triacrylate, 1,1,1-trimethylolpropane triacrylate, 1,1,1-trimethylolpropane trimethacrylate, dipentaerythritol pentaacrylate, pentaerythritol tetraacrylate, and triallyl cyanurate. Examples of a cross-linking agent having four active functional groups can include, but are not limited to, butanediol divinyl ether, tetraallyl pentaerythritol, tetraallyl ortho silicate, N~1~,N~1~,N~2~,N~2~-Tetraallyl-N'~1~,N'~2~-bis (4-methylphenyl)ethanediimidamide, tetraallyl 1,2,3,4-cyclopentanetetracarboxylate, tetraallylsilane, tetraallyl pyromellitate, pentaerythritol tetraallyl ether, and N,N,N',N'-tetraallyl-2,6-pyridinedicarboxamide. Examples of a cross-linking agent having five active functional groups can include, but are not limited to, 1,2,3,5,5-Pentaallyl-1,3-cyclopentadiene, poly(allyl glycidyl ether)-b-poly(ethylene oxide)-b-poly(allyl glycidyl ether), poly(allyl glycidyl ether)-stat-poly(alkyl glycidyl ether)-block-poly(ethylene glycol)-block-poly(allyl glycidyl ether)-stat-poly(alkyl glycidyl ether).

An example of a polymer network is shown below for cross-linked polyvinyl alcohol having three total branching points. An example of a cross-linking agent, triallyl isocyanurate, is also shown below having three active functional groups to create three branches at the branching point.

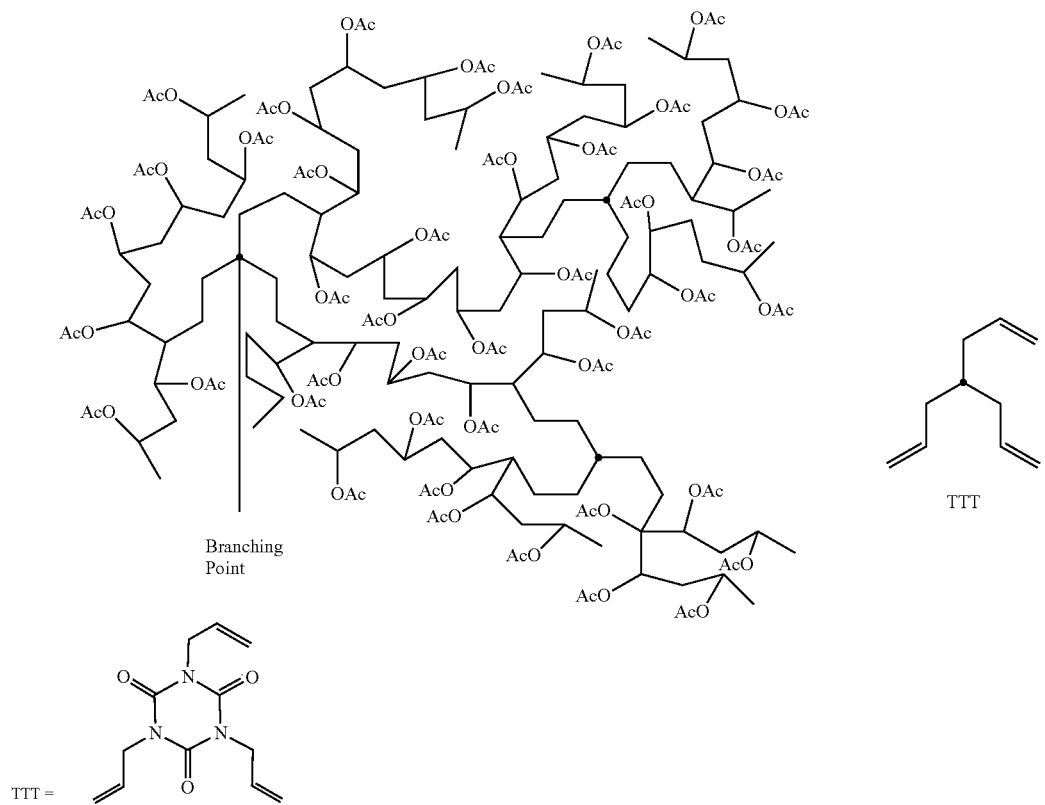

The polymer network can be created via a variety of polymerization reactions, for example, free radical co-polymerization of a vinyl acetate monomer, solvents, and the cross-linking agent. The total number of branching points in the polymer network can be adjusted by adjusting the concentration of the cross-linking agent and/or the polymerization conditions. By way of example, increasing the concentration of the cross-linking agent can increase the total number of branching points and vice versa. The greater the number of total branching points, the greater degree of branching that occurs and yields a larger polymer network. The amount of branching can be determined based on the specific conditions of the wellbore and desired properties of the treatment fluid. By way of example, increased branching can create a larger polymer network, which can plug permeable areas having larger dimensions in addition to increasing the viscosity of the treatment fluid. According to any of the embodiments, the mole ratio of the cross-linking agent to monomer can be in the range of 0.005:100 to 10:100.

The copolymerization amount of the poly-functional monomer residue from the cross-linking agent in the polymer network can vary. According to any of the embodiments, the copolymerization amount of the poly-functional monomer residue from the cross-linking agent can be in the range of 0.001 to 1.0 mol % based on 100 mol % of the structural unit derived from the monomer residue from the polymer (e.g., polyvinyl alcohol). The copolymerization amount from the poly-functional monomer can also be 0.005 to 0.5 mol %, or 0.01 to 0.2 mol %.

The viscosity average degree of polymerization of the polymer can be 1,000 to 10,000, or 1,500 to 6,000, or 2,000 to 5,000. The "viscosity average degree of polymerization" (P) is a value calculated using Eq. 1 from the intrinsic viscosity [η](g/dL) measured at 30° C. with an Ostwald viscometer using ion-exchanged water as a solvent.

$$\log(P) = 1.613 \times \log([\eta] \times 104/8.29) \qquad \text{(Eq. 1)}$$

The lost-circulation material can be in a concentration in the range of 0.1% to 30% by weight of the water (bwow). The lost-circulation material can be in a concentration in the range of 5% to 20% bwow. The concentration of the lost-circulation material can also be selected such that at least 70%, preferably at least 80%, more preferably at least 95% by volume of the base fluid is not lost through the permeable areas of the subterranean formation. A test treatment fluid can be used to determine the predicted performance in an oil or gas operation and necessary concentration of the lost-circulation material. The treatment fluid can maintain a pressure differential of at least 1 psi when tested with a cylindrical void that has a diameter of 0.02 inches. The treatment fluid can maintain a pressure differential of at least 25 psi or 50 psi, when tested with a cylindrical void that has a diameter of 0.02 inches. For predictive performance, the monomer and cross-linking agent and the concentration of the lost-circulation material in the treatment fluid can be selected such that a pressure differential of at least 1 psi with a cylindrical void that has a diameter of 0.02 inches is maintained.

The lost-circulation material can be used to inhibit or prevent fluid flow from the wellbore into the formation or also from the formation into the wellbore (depending on the specific oil or gas operation being performed) via the permeable areas. It should be understood that while some of the treatment fluid may penetrate into the subterranean formation, the majority of the treatment fluid should remain in the wellbore. Moreover, as used herein, the term "penetrate" and all grammatical variations thereof is not intended to preclude some penetration of a certain depth, for example, a few inches, into the formation, but rather is meant to include penetration of depths that would be considered in the industry as lost circulation, and could likely impair oil or gas operations or increase the cost of performing the oil or gas operation.

There can be a multitude of permeable areas comprising the same or different types of voids, such as fractures, fissures, vugs, or interconnected pores. The dimensions of the permeable areas can be different. By way of example, a fracture may have a length that is greater than 50 micrometers; while pores may have dimensions around 10 micrometers. The lost-circulation material may prevent or reduce fluid loss into any of the permeable areas regardless of the dimensions of the permeable areas.

The treatment fluid can include a second lost-circulation material. The second lost-circulation material can be particles that are insoluble in the water of the base fluid. Examples of a second, insoluble LCM include, but are not limited to: ground coal; petroleum coke; sized calcium carbonate; asphaltene; perlite; cellophane; cellulose; ground tire material; ground oyster shell; vitrified shale; a plastic material; paper fiber; wood; cement; hardened foamed cement; glass; foamed glass; sand; bauxite; a ceramic material; a polymeric material (such as ethylene vinyl acetate); a polytetrafluoroethylene material; a nut shell; a seed shell piece; a fruit pit piece; clay; silica; alumina; fumed carbon; carbon black; graphite; mica; titanium oxide; meta-silicate; calcium silicate; kaolin; talc; zirconia; boron; fly ash; a hollow glass microsphere; any composite particle thereof; and any combination thereof.

It is to be understood that while the treatment fluid can contain other ingredients, it is the polymer network lost-circulation material that is primarily or wholly responsible for providing the requisite lost circulation control. For example, a "test treatment fluid" consisting essentially of, or consisting of, the base fluid and the lost-circulation material and in the same proportions as the treatment fluid can have the desirable lost circulation control. Therefore, it is not necessary for the treatment fluid to include other additives, such as a second, insoluble lost-circulation material to provide the desired lost circulation control. In some embodiments, the treatment fluids of the present disclosure can be substantially free of insoluble lost-circulation materials. A "test treatment fluid" can maintain a pressure differential of at least 1 psi, 25 psi, or 50 psi when tested with a cylindrical void that has a diameter of 0.02 inches. It is also to be understood that any discussion related to a "test treatment fluid" is included for purposes of demonstrating that while the treatment fluid being introduced into a wellbore may contain other ingredients, it is the lost-circulation material that provides the desirable lost circulation control. Therefore, while it may not be possible to perform a test in a wellbore for the specific treatment fluid being introduced, one can formulate a test treatment fluid to be tested in a laboratory to identify if the ingredients and concentration of the ingredients will provide the desirable lost circulation control.

The treatment fluid can also contain other ingredients, such as a viscosifier; a filtration control agent; a shale stabilizer; a weighting agent; a pH buffer; an emulsifier; an emulsifier activator (e.g., lime); a dispersion aid; a corrosion inhibitor; an emulsion thinner; an emulsion thickener; a gelling agent; a surfactant; a foaming agent; a gas; a breaker; a biocide; a chelating agent; a scale inhibitor; a gas hydrate inhibitor, a mutual solvent; an oxidizer; a reducer; a friction reducer; a clay stabilizing agent; an oxygen scavenger; and any combination thereof.

The treatment fluid can have desirable properties that can affect the pumpability and suspending capability of the fluid. The treatment fluid can have a plastic viscosity in the range of 10 to 90 centipoise (cP), or 20 to 70 cP at a temperature of 180° F. (82.2° C.). The plastic viscosity can also be in a range such that the treatment fluid is pumpable. The treatment fluid can have a yield point in the range of 8 to 30 pounds per 100 sq. ft. (lb/100 ft$^2$) at a temperature of 180° F. (82.2° C.). The treatment fluid can also have a yield point in a range such that insoluble materials are suspended in the base fluid.

The methods can include combining the base fluid and the lost-circulation material together. According to any of the embodiments, the methods include the step of introducing the treatment fluid into a subterranean formation. The subterranean formation can be penetrated by a wellbore. The well can be an oil, gas, or water production well, a geothermal well, or an injection well. The well includes the wellbore. The subterranean formation can be part of a reservoir or adjacent to a reservoir. The step of introducing the treatment fluid can be a drilling fluid for the purpose of drilling the wellbore. The drilling fluid can be in a pumpable state before and during introduction into the subterranean formation. The well can include an annulus. The step of introducing the treatment fluid can include introducing the treatment fluid into a portion of the annulus. The treatment fluid can also be a spacer fluid, a workover fluid, or a stimulation fluid. The methods can also include introducing one or more additional fluids before and/or after the step of introducing the treatment fluid.

The methods can include causing or allowing the lost-circulation material to reduce loss of the base fluid into permeable areas of the subterranean formation. The lost-circulation material is water soluble. The lost-circulation material can form micro-gels that can coalesce to form a film within the permeable areas. Without being limited by theory, it is believed that the solubility of the lost-circulation material is temperature dependent. Accordingly, micro-gel and film formation may occur when the temperature of the treatment fluid is below the solubility temperature. In practice, the temperature at the bottom of the wellbore may be greater than or equal to the solubility temperature of the lost-circulation material. Then, as the treatment fluid is circulated back up an annulus towards the wellhead, the temperature may be lower than the bottom of the wellbore. At a sufficiently lower temperature, micro-gel and film formation may occur. Alternatively, it is believed that if the water from the base fluid is forced through coalesced micro-gels, then the micro-gels will continue to build upon each other to form a film in the permeable areas. Multiple layers of film can form within the permeable areas to create a thick film that prevents or restricts fluid loss into the subterranean formation. Moreover, a film can form around a second lost-circulation material comprising insoluble particles. Because the lost-circulation material is soluble in the water of the base fluid, the lost-circulation material can advantageously be used, alone or in combination with a second LCM, to fill voids having a variety of dimensions and tubing strings having tight clearances or sharp bends.

An embodiment of the present disclosure is a method of treating a subterranean formation comprising: introducing a treatment fluid into the subterranean formation, the treatment fluid comprising: (i) a base fluid comprising water; and (ii) a lost-circulation material, wherein the lost-circulation material comprises a polymer network having at least one branching point formed with a monomer and a cross-linking agent that comprises at least three active functional groups, wherein the treatment fluid maintains a pressure differential of at least 1 psi when tested with a cylindrical void that has a diameter of 0.02 inches. Optionally, the method further comprises wherein the treatment fluid is a non-settable fluid. Optionally, the method further comprises wherein the water is selected from the group consisting of freshwater, brackish water, and saltwater, in any combination thereof in any proportion. Optionally, the method further comprises wherein the monomer is a vinyl ester-based monomer. Optionally, the method further comprises wherein the vinyl ester-based monomer is selected from vinyl acetate, vinyl propionate, vinyl propionate, vinyl valerate, vinyl caprate, vinyl laurate, vinyl stearate, vinyl benzoate, or vinyl pivalate. Optionally, the method further comprises wherein the fluid loss additive further comprises a second monomer that is co-polymerized with the vinyl ester-based monomer, and wherein the second monomer is selected from: α-olefin monomers; methyl (meth)acrylate, (meth)acrylic acid alkyl ester monomers; unsaturated amide monomers; unsaturated carboxylic acid monomers; alkyl ester monomers of unsaturated carboxylic acids; unsaturated carboxylic acid anhydrides; salts of unsaturated carboxylic acids; glycidyl group-containing monomers; 2-acrylamido-2-methylpropane sulfone including sulfonic acid group-containing monomers; phosphoric acid group-containing monomers; and alkyl vinyl ether monomers. Optionally, the method further comprises wherein the cross-linking agent is selected from propanediol divinyl ether, triallyl ethers, triallyl phosphate, triallyl isocyanurate (TTT), pentaerythritol triacrylate, 1,1,1-trimethylolpropane triacrylate, 1,1,1-trimethylolpropane trimethacrylate, dipentaerythritol pentaacrylate, pentaerythritol tetraacrylate, triallyl cyanurate, butanediol divinyl ether, tetraallyl pentaerythritol, tetraallyl orthosilicate, N~1~,N~1~,N~2~,N~2~-Tetraally-N'~1~,N'~2~-bis(4-methylphenyl)ethanediimidamide, tetraallyl 1,2,3,4-cyclopentanetetracarboxylate, tetraallylsilane, tetraallyl pyromellitate, pentaerythritol tetraallyl ether, N,N,N',N'-tetraallyl-2,6-pyridinedicarboxamide, 1,2,3,5,5-Pentaallyl-1,3-cyclopentadiene, poly(allyl glycidyl ether)-b-poly(ethylene oxide)-b-poly(allyl glycidyl ether), and poly(allyl glycidyl ether)-stat-poly(alkyl glycidyl ether)-block-poly(ethylene glycol)-block-poly(allyl glycidyl ether)-stat-poly(alkyl glycidyl ether). Optionally, the method further comprises wherein the mole ratio of the cross-linking agent to monomer is in the range of 0.005:100 to 10:100. Optionally, the method further comprises wherein the copolymerization amount of the poly-functional monomer residue from the cross-linking agent is in the range of 0.001 to 1.0 mol % based on 100 mol % of the structural unit derived from the monomer. Optionally, the method further comprises wherein the viscosity average degree of polymerization of the polymer is in the range of 1,000 to 10,000. Optionally, the method further comprises wherein the lost-circulation material is in a concentration in the range of 0.1% to 30% by weight of the water. Optionally, the method further comprises wherein the treatment fluid further comprises a second lost-circulation material, and wherein the second lost-circulation material are water insoluble particles. Optionally, the method further comprises wherein the second lost-circulation material is selected from the group consisting of: ground coal; petroleum coke; sized calcium carbonate; asphaltene; perlite; cellophane; cellulose; ground tire material; ground oyster shell; vitrified shale; a plastic material; paper fiber; wood; cement; hardened foamed cement; glass; foamed glass; sand; bauxite; a ceramic material; a polymeric material; a polytetrafluoroethylene material; a nut shell; a seed shell piece; a fruit pit piece; clay; silica; alumina; fumed carbon; carbon black; graphite; mica; titanium oxide; meta-silicate; calcium silicate; kaolin; talc; zirconia; boron; fly ash; a hollow glass microsphere; any composite particle thereof; and any combination thereof. Optionally, the method further comprises wherein the treatment fluid has a plastic viscosity in the range of 10 to 90 centipoise at a temperature of 180° F. Optionally, the method further comprises wherein the treatment fluid has a yield point in the range of 8 to 30 pounds per 100 square feet at a temperature of 180° F. Optionally, the method further comprises wherein the treatment fluid is a spacer fluid, a workover fluid, a drilling fluid, or a stimulation fluid. Optionally, the method further comprises wherein the treatment fluid is introduced into the subterranean formation using one or more pumps.

Another embodiment of the present disclosure is a treatment fluid comprising: a base fluid, wherein the base fluid comprises water; and a lost-circulation material, wherein the lost-circulation material comprises a polymer network having at least one branching point formed with a monomer and a cross-linking agent that comprises at least three active functional groups, wherein the treatment fluid maintains a pressure differential of at least 1 psi when tested with a cylindrical void that has a diameter of 0.02 inches. Optionally, the treatment fluid further comprises wherein the treatment fluid is a non-settable fluid. Optionally, the treatment fluid further comprises wherein the water is selected from the group consisting of freshwater, brackish water, and saltwater, in any combination thereof in any proportion. Optionally, the treatment fluid further comprises wherein the monomer is a vinyl ester-based monomer. Optionally, the treatment fluid further comprises wherein the vinyl ester-based monomer is selected from vinyl acetate, vinyl propionate, vinyl propionate, vinyl valerate, vinyl caprate, vinyl laurate, vinyl stearate, vinyl benzoate, or vinyl pivalate. Optionally, the treatment fluid further comprises wherein the fluid loss additive further comprises a second monomer that is co-polymerized with the vinyl ester-based monomer, and wherein the second monomer is selected from: α-olefin monomers; methyl (meth)acrylate, (meth)acrylic acid alkyl ester monomers; unsaturated amide monomers; unsaturated carboxylic acid monomers; alkyl ester monomers of unsaturated carboxylic acids; unsaturated carboxylic acid anhydrides; salts of unsaturated carboxylic acids; glycidyl group-containing monomers; 2-acrylamido-2-methylpropane sulfone including sulfonic acid group-containing monomers; phosphoric acid group-containing monomers; and alkyl vinyl ether monomers. Optionally, the treatment fluid further comprises wherein the cross-linking agent is selected from propanediol divinyl ether, triallyl ethers, triallyl phosphate, triallyl isocyanurate (TTT), pentaerythritol triacrylate, 1,1,1-trimethylolpropane triacrylate, 1,1,1-trimethylolpropane trimethacrylate, dipentaerythritol pentaacrylate, pentaerythritol tetraacrylate, triallyl cyanurate, butanediol divinyl ether, tetraallyl pentaerythritol, tetraallyl orthosilicate, N~1~,N~1~,N~2~,N~2~-Tetraally-N'~1~,N'~2~-bis(4-methylphenyl)ethanediimidamide, tetraallyl 1,2,3,4-cyclopentanetetracarboxylate, tetraallylsilane, tetraallyl pyromellitate, pentaerythritol tetraallyl ether, N,N,N',N'-tetraallyl-2,6-pyridinedicarboxamide, 1,2,3,5,5-Pentaallyl-1,3-cyclopentadiene, poly(allyl glycidyl ether)-b-poly(ethylene oxide)-b-poly(allyl glycidyl ether), and poly(allyl glycidyl ether)-stat-poly(alkyl glycidyl ether)-block-poly(ethylene glycol)-block-poly(allyl glycidyl ether)-stat-poly(alkyl glycidyl ether). Optionally, the treatment fluid further comprises wherein the mole ratio of the cross-linking agent to monomer is in the range of 0.005:100 to 10:100. Optionally, the treatment fluid further comprises wherein the copolymerization amount of the poly-functional monomer residue from the cross-linking agent is in the range of 0.001 to 1.0 mol % based on 100 mol % of the structural unit derived from the monomer. Optionally, the treatment fluid further comprises wherein the viscosity average degree of polymerization of the polymer is in the range of 1,000 to 10,000. Optionally, the treatment fluid further comprises wherein the lost-circulation material is in a concentration in the range of 0.1% to 30% by weight of the water. Optionally, the treatment fluid further comprises wherein the treatment fluid further comprises a second lost-circulation material, and wherein the second lost-circulation material are water insoluble particles. Optionally, the treatment fluid further comprises wherein the second lost-circulation material is selected from the group consisting of: ground coal; petroleum coke; sized calcium carbonate; asphaltene; perlite; cellophane; cellulose; ground tire material; ground oyster shell; vitrified shale; a plastic material; paper fiber; wood; cement; hardened foamed cement; glass; foamed glass; sand; bauxite; a ceramic material; a polymeric material; a polytetrafluoroethylene material; a nut shell; a seed shell piece; a fruit pit piece; clay; silica; alumina; fumed carbon; carbon black; graphite; mica; titanium oxide; meta-silicate; calcium silicate; kaolin; talc; zirconia; boron; fly ash; a hollow glass microsphere; any composite particle thereof; and any combination thereof. Optionally, the treatment fluid further comprises wherein the treatment fluid has a plastic viscosity in the range of 10 to 90 centipoise at a temperature of 180° F. Optionally, the treatment fluid further comprises wherein the treatment fluid has a yield point in the range of 8 to 30 pounds per 100 square feet at a temperature of 180° F. Optionally, the treatment fluid further comprises wherein the treatment fluid is a spacer fluid, a workover fluid, a drilling fluid, or a stimulation fluid.

The exemplary treatment fluids disclosed herein can directly or indirectly affect one or more components or pieces of equipment associated with the preparation, delivery, recapture, recycling, reuse, and/or disposal of the disclosed fluids. For example, and with reference to FIG. 1, the disclosed fluids can directly or indirectly affect one or more components or pieces of equipment associated with an exemplary wellbore drilling assembly 100. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure. It should also be noted that while FIG. 1 and the discussion of the figure is for a drilling operation and fluid, other types of treatment fluids, such as spacer fluids, workover fluids, and stimulation fluids can be used with the disclosed equipment.

As illustrated, the drilling assembly 100 can include a drilling platform 102 that supports a derrick 104 having a traveling block 106 for raising and lowering a drill string 108. The drill string 108 can include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and can be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 can be arranged at any other location in the drilling assembly 100 to facilitate its proper function, without departing from the scope of the disclosure.

One or more additional fluids can be added to the drilling fluid 122 via a mixing hopper 134 communicably coupled to or otherwise in fluid communication with the retention pit 132. The mixing hopper 134 can include, but is not limited to, mixers and related mixing equipment known to those skilled in the art. In other embodiments, however, the additional fluids can be added to the drilling fluid 122 at any other location in the drilling assembly 100. In at least one embodiment, for example, there could be more than one retention pit 132, such as multiple retention pits 132 in series. Moreover, the retention pit 132 can be representative of one or more fluid storage facilities and/or units where the disclosed fluids can be stored, reconditioned, and/or regulated until added to the drilling fluid 122.

As mentioned above, the disclosed fluids can directly or indirectly affect the components and equipment of the drilling assembly 100. For example, the disclosed fluids can directly or indirectly affect the fluid processing unit(s) 128 which can include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 can further include one or more sensors, gauges, pumps, compressors, and the like used to store, monitor, regulate, and/or recondition the disclosed fluids.

The disclosed fluids can directly or indirectly affect the pump 120, which representatively includes any conduits, pipelines, trucks, tubulars, and/or pipes used to fluidically convey the fluids downhole, any pumps, compressors, or motors (e.g., topside or downhole) used to drive the fluids into motion, any valves or related joints used to regulate the pressure or flow rate of the fluids, and any sensors (i.e., pressure, temperature, flow rate, etc.), gauges, and/or combinations thereof, and the like. The disclosed fluids can also directly or indirectly affect the mixing hopper 134 and the retention pit 132 and their assorted variations.

The disclosed fluids can also directly or indirectly affect the various downhole equipment and tools that can come into contact with the fluids such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed fluids can also directly or indirectly affect any downhole heat exchangers, valves and corresponding actuation devices, tool seals, packers and other wellbore isolation devices or components, and the like associated with the wellbore 116. The disclosed fluids can also directly or indirectly affect the drill bit 114, which can include, but is not limited to, roller cone bits, PDC bits, natural diamond bits, any hole openers, reamers, coring bits, etc.

While not specifically illustrated herein, the disclosed fluids can also directly or indirectly affect any transport or delivery equipment used to convey the fluids to the drilling assembly 100 such as, for example, any transport vessels, conduits, pipelines, trucks, tubulars, and/or pipes used to fluidically move the fluids from one location to another, any pumps, compressors, or motors used to drive the fluids into motion, any valves or related joints used to regulate the pressure or flow rate of the fluids, and any sensors (i.e., pressure and temperature), gauges, and/or combinations thereof, and the like.

EXAMPLES

To facilitate a better understanding of the various embodiments, the following examples are given.

Lost circulation tests were performed as follows. A 16.4 pounds per gallon (ppg) cement slurry was prepared using Portland cement and water. Six cylinders were formed with the cement slurry and cured at 190° F. (87.8° C.) for 24 hrs. 3 cylinders contained a 0.022 inch (in.) diameter monofilament in the center and the other 3 cylinders contained a 0.052" diameter monofilament fiber in the center to replicate a permeable area where fluid loss could occur. At 24 hours, the cylinders were removed from the curing water bath and the monofilament fibers were removed to create a channel. A highly-branched polyvinyl alcohol solution at a concentration of 8% by weight of the water (bwow) as a lost-circulation material (LCM) was mixed in a blender and placed in an atmospheric consistometer cup and heated to 190° F. (87.8° C.). The cured cement cylinders were placed in the lost-circulation material solution and allowed to cool to room temperature. The cement cylinders were then attached to a Teledyne ISCO pump and water was pushed through the channel at a rate of 5 milliliters per min (mL/min) with pressure monitored over time. A pressure differential would occur if fluid flow through the channel was reduced or prevented and would indicate the performance of the lost-circulation material. The maximum pressure differential of the testing equipment was 140 pounds force per square inch (psi).

The results from the 0.022 in. channel are shown in Table 1 below. The elapsed time was how much time had elapsed from when the set cement cylinders were submerged in the LCM solution to when testing began.

TABLE 1

| Sample # | Pressure Differential (psi) | Elapsed Time (hr) |
|---|---|---|
| 1 | 141+ | 6 |
| 1 | 141+ | 72 |
| 2 | 138+ | 72 |
| 3 | 138+ | 72 |

As can be seen in Table 1, all four samples substantially prevented fluid flow through the channels in the cement cylinders. Every sample held pressure to at least the threshold of the testing equipment. This clearly shows that the highly-branched polyvinyl alcohol network functioned extremely well as a lost-circulation material. These results also indicate that the lost-circulation material may hold pressures higher than 140 psi—above the pop-off valve of the testing equipment. Typical wellbore pressures range from less than 50 psi to generally no greater than 100 psi. Accordingly, the LCM should perform well under any wellbore pressures encountered.

The results from the 0.052 in. channel are shown in Table 2 below.

TABLE 2

| Sample # | Pressure Differential (psi) | Concentration of LCM (% bwow) | Elapsed Time (hr) |
|---|---|---|---|
| 1 | 1 | 8 | 4 |
| 1 | 139+ | 10 | 24 |
| 2 | 141+ | 10 | 24 |
| 3 | 138+ | 10 | 24 |

As can be seen in Table 2, the LCM solution at 8% bwow concentration did not reduce fluid loss through the channel as evidenced from no pressure differential. However, all three solutions containing 10% bwow of the LCM achieved maximum performance and held pressure to the limits of the testing equipment. A channel having a diameter of 0.052 in. is larger than typical dimensions encountered in subterranean formations. Accordingly, the LCM should perform well in permeable areas having a variety of dimensions.

Four different spacer fluids were prepared by mixing water, clay, an insoluble particulate, a pH buffer, a suspending additive, and either a highly-branched polyvinyl alcohol (PVA) polymer network or an AMPS copolymer as the lost-circulation material (LCM). The spacer fluids were tested according to the specific testing procedure as described above in the Detailed Description section. The testing results of rheology at revolutions per minute (RPM), plastic viscosity in units of centipoise (cP), yield point in units of pound per 100 square feet (lb/100 ft$^2$), and API fluid loss in milliliters (mL) using a 60 mesh filter are shown in Table 3 below.

TABLE 3

| LCM concentration (% bwow) | Branched PVA LCM | | | | | | AMPS LCM | |
|---|---|---|---|---|---|---|---|---|
| | 7% | | 14% | | 17% | | 7% | |
| Temperature (° F.) Rheology RPM | 80 | 180 | 80 | 180 | 80 | 180 | 80 | 180 |
| 300 | 43 | 27 | 59 | 32 | 97 | 89 | 93 | 89 |
| 200 | 35 | 24 | 45 | 27 | 74 | 72 | 75 | 65 |
| 100 | 24 | 19 | 29 | 20 | 48 | 50 | 53 | 49 |
| 60 | 20 | 17 | 23 | 17 | 35 | 40 | 41 | 40 |
| 30 | 16 | 14 | 17 | 14 | 24 | 30 | 30 | 31 |
| 6 | 10 | 10 | 10 | 10 | 12 | 17 | 16 | 20 |
| 3 | 8 | 8 | 8 | 9 | 14 | 14 | 14 | 15 |
| Plastic Viscosity (cP) | 34 | 18 | 50 | 23 | 87 | 74 | 78 | 69 |
| Yield Point (lb/100 sq. ft.) | 12 | 12 | 11 | 11 | 15 | 21 | 21 | 22 |
| API Fluid Loss (mL) | — | 85 | — | 76 | — | 72 | — | 100 |

As can be seen in Table 3, the rheology of the PVA lost-circulation material was better than or comparable to the AMPS lost-circulation material even at a higher concentration. The plastic viscosity for the PVA, up to a concentration of 14% bwow was better than the AMPS. Moreover, the yield point was better for the PVA compared to the AMPS at every concentration. This indicates that the PVA lost-circulation material exhibits better properties at a variety of concentrations compared to AMPS. The PVA also performed well at temperatures of 80° F. and 180° F.—indicating applicability in a wide range of wellbore temperatures. The plastic viscosity of AMPS is only slightly lowered with an increase in temperature while maintaining the yield point; whereas the plastic viscosity of the PVA design drops by almost 50% with a temperature increase while maintaining the yield point over that range. This indicates the novel treatment fluid would be easier to pump (lower plastic viscosity) and still have the ability to suspend particles (desirable yield point) compared to the AMPS fluid.

As can also be seen in Table 3, the PVA lost-circulation material had less fluid loss at the same concentration (7% bwow) compared to the AMPS lost-circulation material. Fluid loss was further decreased by increasing the concentration of the PVA, while still maintaining desirable properties of the spacer fluid. The results shown in Tables 1-3 demonstrate the improved performance and wide range of applications for a highly-branched copolymer as a lost-circulation material.

Therefore, the compositions, methods, and systems of the present disclosure are well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present disclosure.

As used herein, the words "comprise," "have," "include," and all grammatical variations thereof are each intended to have an open, non-limiting meaning that does not exclude additional elements or steps. While compositions, systems, and methods are described in terms of "comprising," "containing," or "including" various components or steps, the compositions, systems, and methods also can "consist essentially of" or "consist of" the various components and steps. It should also be understood that, as used herein, "first," "second," and "third," are assigned arbitrarily and are merely intended to differentiate between two or more fluids, additives, etc., as the case may be, and does not indicate any sequence. Furthermore, it is to be understood that the mere use of the word "first" does not require that there be any "second," and the mere use of the word "second" does not require that there be any "third," etc.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A treatment fluid comprising:
   a base fluid, wherein the base fluid comprises water; and
   a lost-circulation material, wherein the lost-circulation material comprises a water-soluble polymer network having at least one branching point formed with a monomer and a cross-linking agent that comprises at least three active functional groups,
   wherein the monomer is a vinyl ester-based monomer, and
   wherein the treatment fluid maintains a pressure differential of at least 1 psi when tested with a cylindrical void that has a diameter of 0.02 inches.

2. The treatment fluid according to claim 1, wherein the treatment fluid is a non-settable fluid.

3. The treatment fluid according to claim 1, wherein the water is selected from the group consisting of freshwater, brackish water, and saltwater, in any combination thereof in any proportion.

4. The treatment fluid according to claim 1, wherein the vinyl ester-based monomer is selected from vinyl acetate, vinyl propionate, vinyl propionate, vinyl valerate, vinyl caprate, vinyl laurate, vinyl stearate, vinyl benzoate, or vinyl pivalate.

5. The treatment fluid according to claim 1, wherein the fluid loss additive further comprises a second monomer that is co-polymerized with the vinyl ester-based monomer, and wherein the second monomer is selected from: α-olefin monomers; methyl (meth)acrylate, (meth)acrylic acid alkyl ester monomers; unsaturated amide monomers; unsaturated carboxylic acid monomers; alkyl ester monomers of unsaturated carboxylic acids; unsaturated carboxylic acid anhydrides; salts of unsaturated carboxylic acids; glycidyl group-containing monomers; 2-acrylamido-2-methylpropane sulfone including sulfonic acid group-containing monomers; phosphoric acid group-containing monomers; or alkyl vinyl ether monomers.

6. The treatment fluid according to claim 1, wherein the cross-linking agent is selected from triallyl ethers, triallyl phosphate, triallyl isocyanurate (TTT), pentaerythritol triacrylate, 1,1,1-trimethylolpropane triacrylate, 1,1,1-trimethylolpropane trimethacrylate, dipentaerythritol pentaacrylate, pentaerythritol tetraacrylate, triallyl cyanurate, tetraallyl pentaerythritol, tetraallyl orthosilicate, N~1~,N~1~,N~2~, N~2~-Tetraallyl-N'~1~,N'~2~-bis(4-methylphenyl)ethanediimidamide, tetraallyl 1,2,3,4-cyclopentanetetracarboxylate, tetraallylsilane, tetraallyl pyromellitate, pentaerythritol tetraallyl ether, N,N,N',N'-tetraallyl-2,6-pyridinedicarboxamide, 1,2,3,5,5-Pentaallyl-1,3-cyclopentadiene, poly(allyl glycidyl ether)-b-poly(ethylene oxide)-b-poly(allyl glycidyl ether), and poly(allyl glycidyl ether)-stat-poly(alkyl glycidyl ether)-block-poly(ethylene glycol)-block-poly(allyl glycidyl ether)-stat-poly(alkyl glycidyl ether).

7. The treatment fluid according to claim 1, wherein the mole ratio of the cross-linking agent to monomer is in the range of 0.005:100 to 10:100.

8. The treatment fluid according to claim 1, wherein the copolymerization amount of the poly-functional monomer residue from the cross-linking agent is in the range of 0.001 to 1.0 mol % based on 100 mol % of the structural unit derived from the monomer.

9. The treatment fluid according to claim 1, wherein the viscosity average degree of polymerization of the polymer network is in the range of 1,000 to 10,000.

10. The treatment fluid according to claim 1, wherein the lost-circulation material is in a concentration in the range of 0.1% to 30% by weight of the water.

11. The treatment fluid according to claim 1, wherein the treatment fluid further comprises a second lost-circulation material, and wherein the second lost-circulation material are water-insoluble particles.

12. The treatment fluid according to claim 11, wherein the second lost-circulation material is selected from the group consisting of: ground coal; petroleum coke; sized calcium carbonate; asphaltene; perlite; cellophane; cellulose; ground tire material; ground oyster shell; vitrified shale; a plastic material; paper fiber; wood; cement; hardened foamed cement; glass; foamed glass; sand; bauxite; a ceramic material; a polymeric material; a polytetrafluoroethylene material; a nut shell; a seed shell piece; a fruit pit piece; clay; silica; alumina; fumed carbon; carbon black; graphite; mica; titanium oxide; meta-silicate; calcium silicate; kaolin; talc; zirconia; boron; fly ash; a hollow glass microsphere; any composite particle thereof; and any combination thereof.

13. The treatment fluid according to claim 1, wherein the treatment fluid has a plastic viscosity in the range of 10 to 90 centipoise at a temperature of 180° F.

14. The treatment fluid according to claim 1, wherein the treatment fluid has a yield point in the range of 8 to 30 pounds per 100 square feet at a temperature of 180° F.

15. The treatment fluid according to claim 1, wherein the treatment fluid is a spacer fluid, a workover fluid, a drilling fluid, or a stimulation fluid.

16. The treatment fluid according to claim 1, wherein the treatment fluid maintains a pressure differential of at least 25 psi when tested with a cylindrical void that has a diameter of 0.02 inches.

17. The treatment fluid according to claim 1, wherein the treatment fluid further comprises an additive.

18. The treatment fluid according to claim 17, wherein the additive is selected from the group consisting of a viscosifier; a filtration control agent; a shale stabilizer; a weighting agent; a pH buffer; an emulsifier; an emulsifier activator; a dispersion aid; a corrosion inhibitor; an emulsion thinner; an emulsion thickener; a gelling agent; a surfactant; a foaming agent; a gas; a breaker; a biocide; a chelating agent; a scale inhibitor; a gas hydrate inhibitor, a mutual solvent; an oxidizer; a reducer; a friction reducer; a clay stabilizing agent; an oxygen scavenger; and combinations thereof.

* * * * *